United States Patent [19]
Boulenger

[11] 3,979,293
[45] Sept. 7, 1976

[54] APPARATUS FOR THE PURIFICATION OF EFFLUENT

[75] Inventor: Paul Boulenger, Grenoble, France

[73] Assignee: L'Air Liquide, Societe Anonyme pour l'Etude et l'Exploitation des Procedes Georges Claude, Paris, France

[22] Filed: Sept. 3, 1975

[21] Appl. No.: 610,009

Related U.S. Application Data

[62] Division of Ser. No. 477,343, June 7, 1974, Pat. No. 3,945,916.

[30] Foreign Application Priority Data
June 25, 1973 France .................. 73.23073

[52] U.S. Cl. .................. 210/96 R; 210/120;
210/151; 210/195 S; 210/220
[51] Int. Cl.² .................. C02C 1/08
[58] Field of Search ............ 210/7, 15, 17, 63, 120, 210/150, 151, 195 M, 197, 220, 221 R, 96 R

[56] References Cited
UNITED STATES PATENTS

| | | | |
|---|---|---|---|
| 895,229 | 8/1908 | Beddoes | 210/15 |
| 3,462,360 | 8/1969 | McKinney | 210/195 M X |
| 3,468,795 | 9/1969 | Bye-Jorgensen et al. | 210/220 X |
| 3,547,811 | 12/1970 | McWhirter | 210/120 X |
| 3,557,954 | 1/1971 | Welch | 210/151 X |
| 3,696,929 | 10/1972 | Shah | 210/220 X |
| 3,704,783 | 12/1972 | Antonie | 210/151 |
| 3,773,660 | 11/1973 | Hopwood | 210/151 X |
| 3,840,216 | 10/1974 | Smith et al. | 210/63 X |
| 3,878,097 | 4/1975 | Mochizuki et al. | 210/195 M X |

Primary Examiner—Charles N. Hart
Assistant Examiner—Robert H. Spitzer
Attorney, Agent, or Firm—Browdy and Neimark

[57] ABSTRACT

An improved process for the purification of effluent is disclosed in which oxygenated effluent is introduced into a treatment zone in which a part of the total amount of biologically activated sludge used in the process is fixed on immersed bacterial beds or discs which are mobile and a further part of said sludge is in suspension in effluent undergoing treatment.

6 Claims, 1 Drawing Figure

U.S. Patent  Sept. 7, 1976  3,979,293
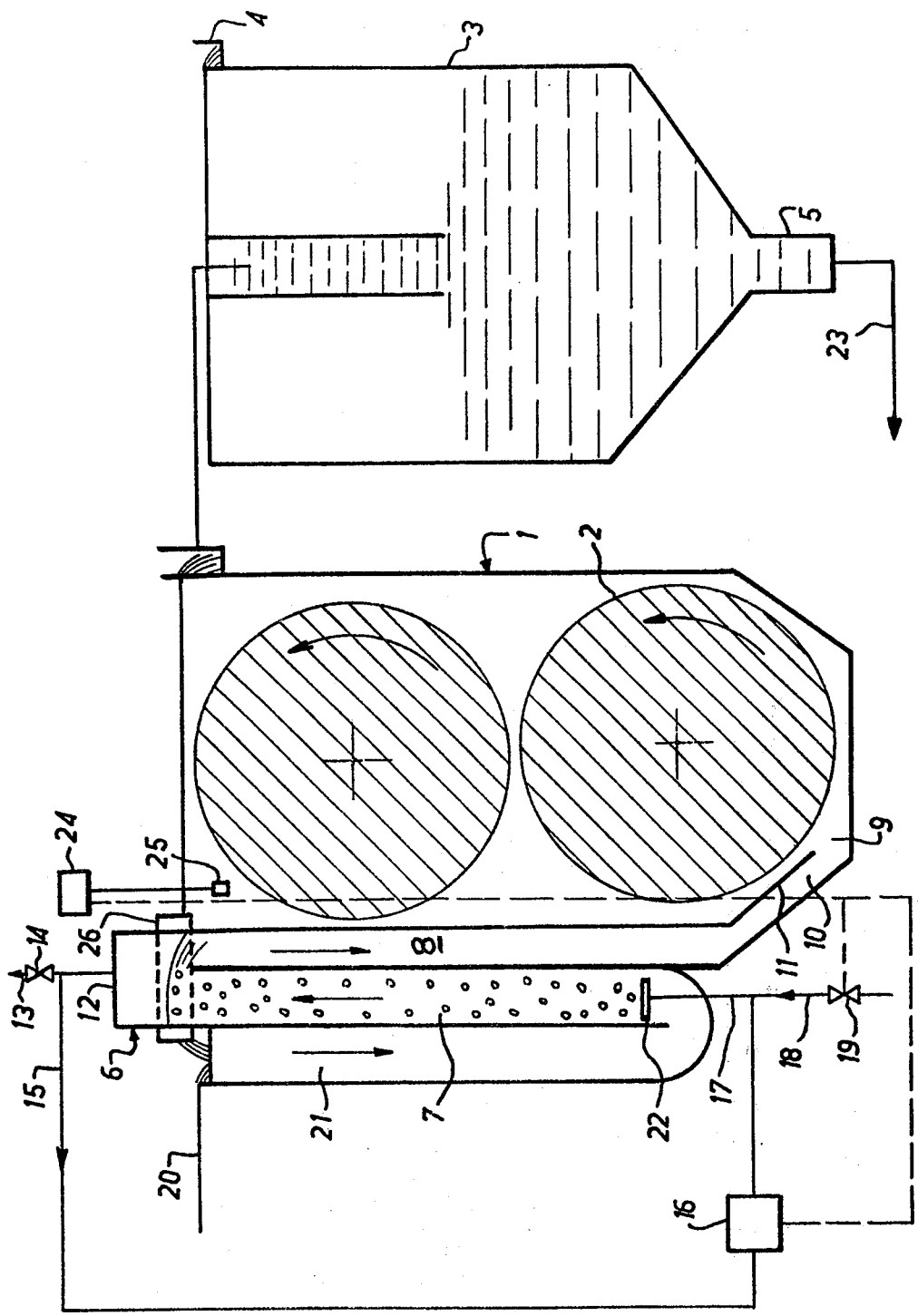

APPARATUS FOR THE PURIFICATION OF EFFLUENT

CROSS REFERENCE TO RELATED APPLICATION

This is a division of application Ser. No. 477,343, filed June 7, 1974, now U.S. Pat. No. 3,945,916.

BACKGROUND OF THE INVENTION

This invention relates to a process and to an installation for the purification of effluent or liquid-based waste. It relates more particularly to the purification of effluent with the aid of pure oxygen or enriched air.

In known purification installations, effluent is contained in a tank through the bottom of which oxygen or oxygen-enriched air is injected, the tank being covered so as to permit recovery and recycling of the gaseous phase which accumulates above the surface of the effluent. These installations have the disadvantage that they result in an accumulation of nitrogen (supplied by the enriched air) and of carbon dioxide (resulting from the respiration of microorganisms present in the tank) in the gaseous phase which is recycled; this disadvantage results either in a diminution in the efficiency of purification or in the necessity of providing installations for monitoring the component concentration in the recycled gas, the result therefore being an increase in the cost price of the installation.

Furthermore, in known installations, it is necessary to manipulate large volumes of sludge which makes necessary the presence of large-volume decanting or settling equipment and the presence of recycling instruments which consume a large quantity of energy.

SUMMARY OF THE INVENTION

It is an object of the present invention to provide an improved process and installation permitting palliation of the disadvantages of the known processes and installations described above. It is a further object to make it possible to prevent the pure oxygen or oxygen-enriched air from being constantly enriched with nitrogen and/or carbon dioxide and to dispense with constant monitoring of the component content of the recycled gas and therewith the necessity of appropriately adapting the flow rate of the recycled gas and/or the feed rate of the pure oxygen or oxygen-enriched air. It is a further object of the invention to provide a process such that there is attained achievement of a considerable degree of economy both with regard to the capital assets required to construct the purification installation and with regard to the oxygen consumption (due to the lower oxygen losses) and the amount of energy required (it being possible to diminish the supply of energy required for mixing and for recirculation of the sludge in comparison with conventional installations). Accordingly, the present invention provides a process for the purification of effluent using an oxygen-rich gas in which the effluent is mixed with a biologically activated sludge, wherein the effluent/sludge mixture thus obtained is oxygenated and then is introduced into a treatment zone in which a quantity of activated sludge is fixed on vertically disposed, mobile discs immersed within the treatment zone and a further quantity of activated sludge is in suspension in the effluent undergoing treatment.

The expression "oxygenated gas" is used herein for purposes of simplification and means both pure oxygen and oxygen-enriched air.

DESCRIPTION OF THE PREFERRED EMBODIMENTS

In one embodiment of the invention, the waste waters/biological sludge mixture obtained is charged with oxygen by mixing the effluent and the oxygenated gas in cocurrent flow in a preliminary or oxygenation zone. The oxygenating gas is advantageously injected so that it imparts lift to the effluent/sludge mixture so as to achieve circulation thereof. Preferably, the mixture thus obtained contains a pre-determined proportion of the effluent/sludge mixture fed back, e.g. via an overflow, from the treatment zone.

In a further embodiment of the invention, there is employed an oxygenation zone which itself comprises at least two portions the effluent/sludge mixture in which portions has mutually different directions of circulation, e.g. an ascending zone and a descending zone, the descending zone debouching into the treatment zone. Passage of the mixture from the ascending zone to the descending zone may be effected due to overflow. The oxygenation zone preferably includes a free space at the upper portion thereof for accumulating non-dissolved gas. This space is preferably provided with a first conduit for placing the free space into communication with the atmosphere and a second conduit for recycling the non-dissolved gas.

The injection of oxygenating gas is preferably effected through the lower portion of part of the oxygenation zone, in which the direction of mass flow is upwards. In this way, the oxygenating gas which is injected acts as a "gaslift" which is utilized as a mechanical means for introducing the effluent/sludge mixture to the treatment zone.

Advantageously, the oxygenation zone includes a passage in which the direction of mass flow is downwards and which serves as an inlet passage for the treatment zone, the lower end of the passage being provided with means for accelerating the effluent/sludge mixture towards the base of the treatment zone. This passage may be constituted by the descending zone of the oxygenation zone already described.

Mixing of the suspension contained in the treatment zone is effected solely by recirculation of the mixture obtained from the oxygenation zone. The mixing effect produced by rotation of the bacterial discs or beds is not negligible and contributes to maintaining the state of suspension in the treatment zone.

The treatment zone will generally be associated with a clarifier in which the outflow from the treatment zone stratifies, the biologically active sludge which has settled in the clarifier being recycled to the oxygenation zone; the oxygenating gas injected therein may then be utilized as a mechanical means for recirculation of this settled sludge.

The oxygenating gas injected, for example, at the lower-most portion of the ascending zone of the oxygenation zone may consist of pre-determined proportions of pure oxygenated gas and non-dissolved gas which has accumulated in the free space at the upper portion of the oxygenation zone, the latter gas having been compressed. Advantageously the treatment zone is provided with means for controlling the oxygen requirement of the effluent, thereby providing for automatic regulation of the flow rates of pure oxygenated gas and of said non-dissolved gas which is recycled.

The present invention also relates to an installation for carrying into effect the process described hereinabove.

Further objects and advantages of the invention will become apparent on reading the description given hereinbelow and on studying the accompanying drawing which is strictly non-limitative and illustrates an installation by means of which a presently preferred embodiment of the process according to the invention may be carried out.

Referring now to the drawing, the installation comprises a treatment tank the contents of which constitute the treatment zone and the capacity of which corresponds to the desired effluent treatment rate. The treatment tank contains vertically disposed, mobile bacterial beds or discs 2. These bacterial discs (which are well-known per se) are in the present case simple plane discs 1 cm. thick and spaced 2.5 cm. apart, and on which are maintained approximately 1.5 to 2 kg. of sludge/$m^3$ of tank, whereof more than 1 kg comprises active, living material. The treatment zone is connected by an overflow to a clarifier 3 which is itself provided with an overflow 4 permitting recovery of purified water and with a chamber 5 for recovery of settled sludge.

Upstream of the treatment tank 1 there is disposed an oxygenation zone 6. The oxygenation zone comprises an ascending zone 7, a descending zone 8 debouching into the lower regions 9 of the treatment tank through intermediary of a passage 10 of regulatable diameter. The passage 10 may be constituted, for example, by a wall 11 adapted to approach or move away from the wall of the chamber with which it is associated. The means permitting displacement of the said wall 11 has not been shown, for purposes of simplification; by way of non-limitative example of such means, there may be mentioned rack elements associated with a release spring; any means which appeals to the person skilled in the art is suitable.

The upper portion 12 of the oxygenation zone is designed to act as a free space permitting the accumulation of nondissolved gas coming from the effluent with which oxygenating gas has been contacted. The upper portion 12 is associated with a first conduit 13, and a valve 14, for air contact on the one hand, and, on the other hand, with a second conduit 15 for recycling the non-dissolved gas which is returned via a compresser 16 into a conduit 17 for introduction of oxygenating gas. The conduit 17 is associated with a conduit 18 and a valve 19 for introduction of oxygen or oxygen-enriched air.

The effluent to be processed is introduced through a conduit 20 into an inlet zone 21 at the bottom of which it debouches into the oxygenation zone 6 into which are provided means 22 for the injection of oxygenating gas. The biologically activated sludge recovered in the chamber 5 of the clarifier 3 is returned by a conduit 23 (not shown in full) into the zone 7 where the oxygenated gas acts as a pump for returning and circulating the recycled sludge. A portion of the effluent/sludge liquor from the treatment tank 1 overflows into a recovery spout 26 from which it is returned to the inlet zone 21.

Means is provided for measuring the oxygen concentration of the effluent and for controlling the functioning of the installation (e.g. the opening and closing of valves); this is shown diagramatically at 24, and is associated with an oxygen probe 25 for determining the oxygen requirement of the effluent contained in the treatment tank 1. The parts 24 and 25 trigger the opening and closure of valve 19 for inflow of pure oxygen or oxygen-enriched air, and control the compressor 16. They may, optionally, also control the displacement of the wall 11.

The mode of functioning of the installation shown in the drawing will now be described. The effluent to be processed is introduced through conduit 20 and enters the inlet zone 21; a portion of the effluent/sludge liquor floating in the treatment tank 1, introduced by the spout 26, is also returned into the inlet zone 21. The mixture to be processed, introduced through conduit 20, and the portion of the effluent/sludge liquor introduced through the spout 26, to which is added settled sludge coming from the clarifier 3 and supplied via the conduit 23, passes into the ascending zone 7 of the oxygenation zone. Simultaneously, there are introduced into the zone 7 through the injector 22 the residual gaseous phase introduced through the conduit 15, after being drawn from the free space at 12 by the compressor 16, and pure oxygen or oxygen-enriched air supplied through the conduit 18 and the valve 19.

The gases injected by the injector 22 act as a mechanical means for effecting and maintaining the flow of (a) the raw effluent to be treated (supplied through the conduit 20); (b) the portion of liquor obtained from the treatment tank itself (through the spout 26); and (c) the settled sludge (supplied through the conduit 23) which consequently are recycled. The gas thus aids in the circulation throughout the installation. The liquid-mixture obtained then flows into the zone 8, while the non-dissolved gas is recovered in the free space at the upper portion 12 of the oxygenation zone 6. The mixture then enters the passage 10 and thence the treatment tank 1. The oxygen content of the supernatant gaseous phase in 12 is lower than 30 percent and the volume rejected by the conduit 13 is relatively small. The utilization efficiency of the oxygen is approximately 90 percent.

In this embodiment of the invention, the tank 1 must not be covered and problems involving fluid-tightness of the structure for ensuring isolation of a supernatant gaseous phase consequently do not arise; in fact, the non-dissolved gas is recovered in a separate area (the zone 12), involving only little cost for construction purposes, and this is to be added to the gain resulting from the reduction of the volume of the biological tanks derived from the utilization of pure oxygen or enriched air.

A further advantage of this embodiment is that it prevents excessive accumulation of carbon dioxide in the non-dissolved gaseous phase. Carbon dioxide is formed in the treatment tank and is discharged therefrom directly to the atmosphere by natural equilibration of the gaseous partial pressures.

It is yet another advantage of the process of the invention (connected with the utilization of pure oxygen or enriched air) that there is a reduction in energy expenditure. There is obtained on the one hand a reduction in the quantity of energy needed to inject gas dependent upon the ratio of the oxygen concentration of the recycled or injected as relative to that of air. Furthermore, contrary to other processes wherein pure oxygen or enriched air is employed and in which the gas flow is inadequate to provide for mixing and wherein it is necessary to effect mechanical mixing with the aid of a screw or a surface turbine, the process according to the present invention makes it possible to effect mixing due solely to the circulation of the mixture derived from the aeration system. It is found, in fact, that in order to maintain the sludge in suspension, a mean flow velocity in tank 1 of the order of a few meters per hour will suffice. Such a velocity is readily obtained by the injection of high concentration oxygenated gases in for example a "gas-lift", thereby guaranteeing a high circulation velocity for a small gas volume (to the extent that the lifting height remains at a small value).

It would be possible to increase the mass flow velocity by acting on the wall 11 so as to constrict the passage 10.

It is yet a further advantage of the present process that it permits recovery of non-dissolved gas in reduced volume. The volume of the gaseous phase is lower in volume than that necessary for the carbon dioxide produced at the permitted partial pressure for the said gas in the gaseous phase. Under these conditions, the supernatant gaseous phase is substantially more satisfactorily exhausted.

It is known that one of the problems involved in the large oxygen requirement on using atmospheric air is due to the fact that inadequate transfer results in utilization of considerable mechanical power (resulting in foaming or frothing, and in overflowing) and also in the destruction of the biological flocc. Due to the present invention, aeration is effected externally of the treatment tank and, since the mean circulation velocity is low, it is possible to obviate the aforesaid disadvantage whilst at the same time readily satisfying an increase in oxygen demand.

The means permitting adjustment of oxygen demand may be: (a) enrichment with oxygen or oxygenated gas (due to opening the valve 19 controlled by the means shown diagramatically at 24, actuated by the probe 25); and (b) optionally, modification of the injection depth or the connection of auxiliary "gas lifts" (not shown in the drawing but readily carried into effect by the persons skilled in the art).

In the tank 1, the effluent is contacted with biologically activated sludge carried on the mobile bacterial beds or discs 2. It is thus possible to obtain considerable sludge concentrations in the tank 1.

The purified water recovered therefrom is introduced into clarifier 3 where it is kept sufficiently long to ensure that the sludge which it contains is able to stratify by settling.

In fact, the dimensioning of the clarifier is not affected by maintainance of a high concentration of microorganisms in the treatment tank, since a portion of the said micro-organisms remains fixed in the tank.

Of course, the present invention is not limited to the embodiments specifically described and illustrated; it is capable of numerous variations which are within the scope and ability of the persons skilled in the art, without thereby departing from the scope of the invention.

What is claimed is:

1. An apparatus for the purification of a waste-containing liquid by oxygenation of said waste-containing liquid with an oxygen-enriched gas in contact with a biologically activated sludge, which apparatus comprises:
   a. an uncovered main treatment tank for containing a liquor comprising a suspension of the biologically activated sludge in the waste-containing liquid;
   b. withdrawing means of the overflow type connected to said treatment tank for withdrawing an effluent portion of the liquor;
   c. an inlet receptacle, separate from said main treatment tank, for containing a waste/sludge mixture;
   d. feeding means connected to said treatment tank for withdrawing another portion of the liquor from said treatment tank and feeding said portion into said inlet receptacle;
   e. introduction means for introducing raw waste-containing liquid into said inlet receptacle;
   f. a preliminary oxygenation chamber ensuring flow from said inlet receptacle to said main treatment tank, said preliminary oxygenation chamber comprising:
      an ascending flow-path entrance conduit extending inside said inlet receptacle and opening at its lower end into said inlet receptacle,
      a descending flow-path discharge conduit extending into said main treatment tank and opening at its lower end into said main treatment tank, and
      a gas-accumulation receiver, above said entrance and discharge conduits, in fluid communication with the upper ends thereof;
   g. gas injecting means for injecting the oxygen-enriched gas upwardly into said ascending flow-path entrance conduit to oxygenate said waste/sludge mixture within said ascending flow-path entrance conduit; and
   h. recycling means for recycling at least a portion of the non-dissolved gas recovered in said gas-accumulation receiver, said recycling means comprising:
      a compressor communicating on the suction side with the gas-accumulator receiver and on the delivery side with said gas-injecting means,
   wherein said gas-injecting means and said recycling means impart circulation of the oxygenated waste/sludge mixture successively upwardly through said ascending flow-path entrance conduit and downwardly through said descending flow-path discharge conduit into said main treatment tank.

2. An apparatus in accordance with claim 1 further including:
   i. a mobile support of the bacterial bed type entirely located within said main treatment tank below said withdrawing means thereby allowing total submersion of said mobile support in the liquor within said main treatment tank.

3. An apparatus in accordance with claim 1 further including:
   j. control means for controlling the oxygen concentration in the liquor within said main treatment tank, said control means including a probe means for detecting the oxygen concentration of the liquor within said main treatment tank and means for adjusting at least one of the following parameters in response to the concentration detected by said probe means:
   1. the feed-rate of the oxygen-enriched gas injected through said gas-injecting means,
   2. the level of said gas-injecting means within said ascending flow-path entrance conduit,
   3. the flow-rate of the oxygenated waste/sludge mixture within said descending flow-path discharge conduit, and
   4. the flow-rate of the non-dissolved recycled gas within said recycling means.

4. An apparatus in accordance with claim 3 wherein the lower end of said descending flow-path discharge conduit is of regulatable cross-section, thus allowing control of the flow-rate of the oxygenated waste/sludge mixture within said descending flow-path discharge conduit.

5. An apparatus in accordance with claim 1 wherein said gas-injecting means includes a supply conduit for the oxygen-enriched gas connected into the conduit coming from the delivery side of said compressor.

6. An apparatus in accordance with claim 1 further including settlement means for receiving the effluent portion of the liquor removed by said withdrawing means and return means for returning a portion of the settled sludge from said settlement means to said inlet receptacle.

* * * * *